L. BRUN.
POWER TRANSMITTING PLANT.
APPLICATION FILED FEB. 15, 1912.
1,058,697.
Patented Apr. 8, 1913.
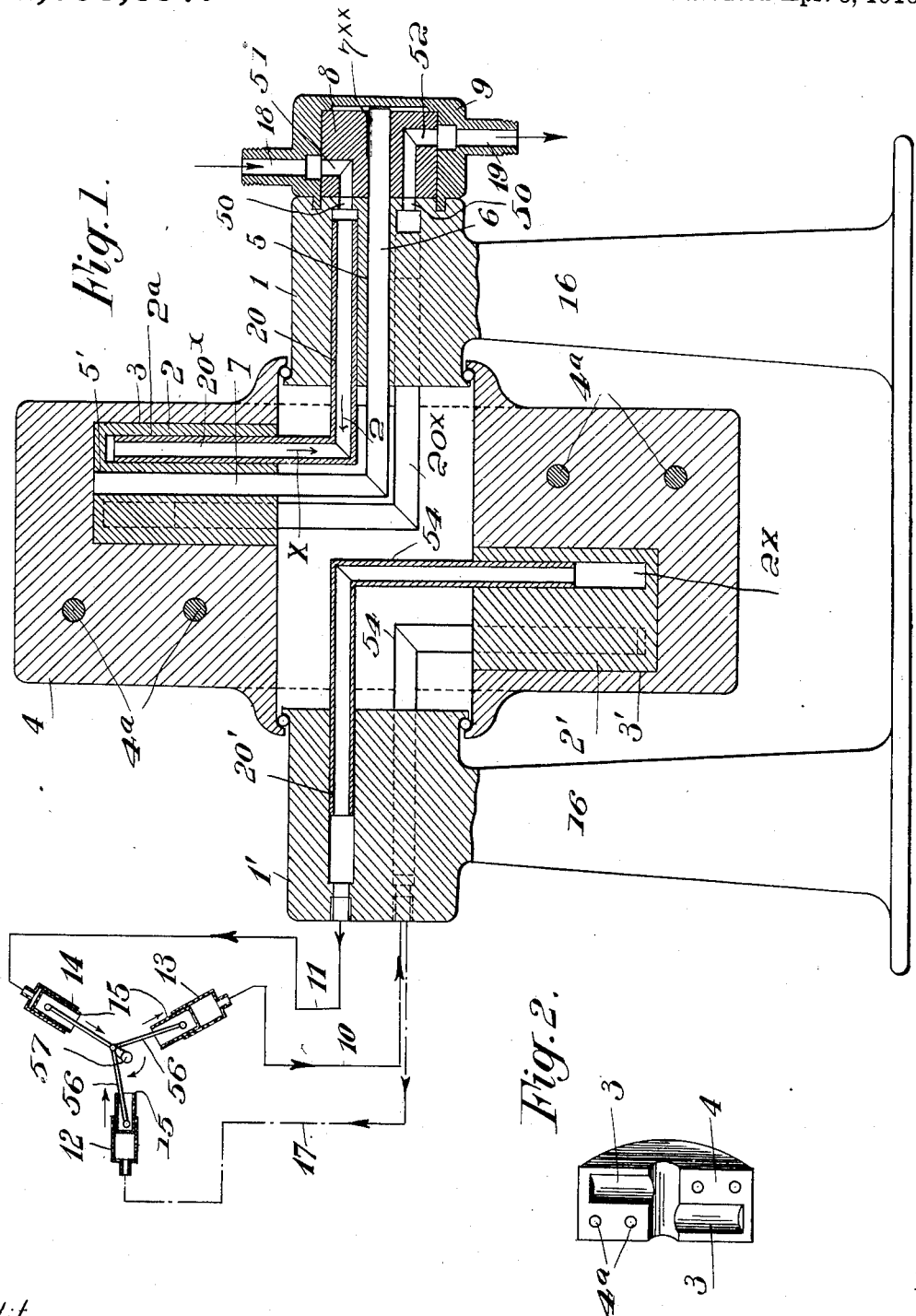
Witnesses:
F. M. Meyer
M. B. Stern
Inventor:
Louis Brun.
By ................ Attorney.

UNITED STATES PATENT OFFICE.

LOUIS BRUN, OF ST. CHAMOND, FRANCE.

POWER-TRANSMITTING PLANT.

1,058,697.   Specification of Letters Patent.   Patented Apr. 8, 1913.

Original application filed August 1, 1911, Serial No. 641,842. Divided and this application filed February 15, 1912. Serial No. 677,837.

*To all whom it may concern:*

Be it known that I, LOUIS BRUN, a citizen of the French Republic, and resident of St. Chamond, France, have invented certain new and useful Improvements in Power-Transmitting Plants, of which the following is a specification.

This invention relates to improvements in motors, this application being divided from an application filed by me on August 1, 1911, Serial No. 641,842.

The object of the invention is to provide means for converting sliding and rotary motion of a plurality of angular pistons into rotary motion for producing economical and efficient power.

The invention also comprehends improvements in the specific construction and arrangement of parts, which will be hereinafter described and particularly pointed out in the claims.

In the accompanying drawings, Figure 1 is a vertical section of my improved motor, and its associated parts. Fig. 2 is a detail view of one section of the rotor.

16 indicates spaced apart standards, the upper heads 1 and 1' of which are provided with a plurality of horizontal bores 20 and 20'. Mounted to rotate on the heads 1 and 1', is a rotor, 4, formed in sections and bolted together at 4ª. Each section is formed with semi-circular recesses disposed on opposite sides of the center, and which form cylindrical openings 3, when the two sections are bolted together. Mounted to rotate in the circular openings 3, are cylindrical elements 2 and 2'. The cylindrical element 2, is formed with a plurality of bores 2ª, arranged around a central opening 5'. The bores in the cylindrical elements 2 and 2' correspond to the bores 20 and 20' in the heads 1 and 1'.

A cranked shaft 7, fits in the central openings 5' and 5 in the cylindrical element 2 and the head 1, whereby to form a support for the element 2. Fitting in the bores 20 in head 1, and the bores 2ª in the cylindrical element 2, are hollow angular pistons 20$^x$ which communicate with ports 50, in the end of head 1. Located to rotate in a casing 9, fitted against the head 1, is a valve 8, formed with an inlet port 51, which communicates with an inlet duct 18, and also formed in the valve is an outlet port 52, which communicates with an outlet duct 19. The valve 8, is splined at 7$^{xx}$ to the horizontal arm of the crank shaft 7, whereby to cause the valve to rotate with the rotor 4.

Operating in the bores 3' in the cylindrical element 2' and the bores 20' in head 1' are the ends of hollow angular pistons 54. Pipes, indicated conventionally at 10, 11 and 17, communicate with the bores 20', in the head 1ª and lead to cylinders 12, 13 and 14. Operating in each cylinder is a piston 15, connected by a pitman 56, with a crank shaft 57. The bores 3', angular pistons 54, pipes 10, 11, and 17, and the cylinders contain fluid which operates the pistons 15, when the angular pistons 54 are operated, as will be described later on.

In operation, motive fluid enters the duct 18, and thence passes through the ports 51, in registry with the several angular pistons which act as drivers, the upper piston 20$^x$ being in position to accomplish this result. The motive fluid passes through the hollow pistons and contacts with the end walls of the bores in the cylindrical element 2. Pressure of the fluid is then against the two angular surfaces of the angular pistons, in direction of the arrows $x$ and $z$. This pressure tends to force the pistons out of the bores 20 in the head 1, in the direction of the arrow $z$, and thereby rotates the cylindrical element 2. The pressure of the fluid between the inner end of the bores in the cylindrical element 2, and against the horizontal surface of the angular pistons 20$^x$, in direction of the arrow $x$, serves to force the pistons out of the bores of said cylindrical element, while the latter is rotating in the cylindrical opening 3. When the angular pistons are reciprocated, they not only rotate the cylindrical element in the cylindrical opening, but they also impart a rotary motion to said element 2 around the horizontal axis of the rotor 4, consequently the latter is also revolved. When the cylindrical element has made one half of a revolution, the ports 50 are shut off from the ports 51, and said ports 50 register with the ports 52, and the fluid exhausts through the duct 19, when the pistons are returned to their normal retracted position in the bores. While the rotor 4, is rotating, the cylindrical element 2' is rotating with it and the angular pistons 54 are operated in substantially the same manner as the angular pistons 20, consequently, the cylindrical element 2' is revolved in the opening 3'. When the pistons 54 are operated, the fluid therein is forced under compression through the pipes, and to the cylinders to operate the crank shaft 57. The parts are so timed that immediately the pistons 15 reach the limit of their stroke in one direction, the angular pistons 54 reach the limit of their movement, consequently a uniform compression on the cylinders 15 takes place and therefore a uniform movement is imparted to the crank shaft 57. The fluid is forced to the pistons 15, by the movement of the angular pistons to drive the crank shaft, while the pistons 15 force the fluid back through the angular pistons when exhausting from the cylinders 12, etc. The motive fluid operating through the medium of the angular pistons $20^x$ rotates the cylindrical element 2, in its opening 3 and at the same time the rotor 4 is revolved. By this construction, the head 1, in which the bores are formed, remains stationary and the rotary motion of the element 2 and rotor 4, will cause the pistons to freely pass each other in their reciprocation in the bores.

Obviously, by providing the cylinders operating in conjunction with the crank shaft 57, the power derived from the rotor may be transmitted to operate suitable mechanism.

What I claim is:—

1. In an apparatus of the class described, the combination of a rotor having a cylindrical opening, bearings at opposite ends of said rotor, a cylindrical element mounted in the cylindrical opening, one of said bearings having a plurality of bores with communicating ports, the cylindrical element having a plurality of bores corresponding to the number of bores in the bearing, hollow angular pistons having their ends operating in the bores in the head and cylindrical element, a valve having inlet and outlet ports which communicate with the ports in the head, means for supplying motive fluid to the inlet ports to operate on the angular pistons and rotate the cylindrical element in its opening and to rotate the rotor, the motive fluid being exhausted from the angular pistons through the outlet ports.

2. In an apparatus of the class described, the combination of a rotor, stationary bearings at opposite ends of the rotor, one of said bearings having a plurality of longitudinal bores with ports communicating therewith, a plurality of angular pistons operating in the bores, means carried by the rotor with which the angular pistons coöperate to rotate the rotor, means for admitting motive fluid to the bores to operate the angular pistons, and means to permit the exhaust of the motive fluid from the bores.

3. In an apparatus of the class described, the combination of a rotor having a cylindrical opening, bearings at opposite ends of said rotor, a cylindrical element mounted in the cylindrical opening, one of said bearings having a plurality of bores with communicating ports, the cylindrical element having a plurality of bores corresponding to the number of bores in the bearing, hollow angular pistons having their ends operating in the bores in the head and cylindrical element, a valve having inlet and outlet ports which communicate with the ports in the head, means for supplying motive fluid to the inlet ports to operate on the angular pistons and rotate the cylindrical element in its opening and to rotate the rotor, the motive fluid being exhausted from the angular pistons through the outlet ports, a second cylindrical element mounted in the rotor, said second mentioned cylindrical element having bores, the adjacent bearing having bores corresponding to the bores in the second mentioned cylindrical element, angular hollow pistons fitting in the bores in the second mentioned cylindrical element and the adjacent bearing, a pipe communicating with each bore in the adjacent bearing, a cylinder connected to each pipe, a reciprocating piston in each cylinder, a crank shaft and a pitman connecting the pistons and the crank shaft, the pipes and bores in the second mentioned cylindrical element having fluid which operates the pistons in the cylinders when the angular pistons are operated.

In testimony whereof I have hereunto set my hand in presence of two witnesses.

LOUIS BRUN.

Witnesses:
H. TOSCAL,
EDMOND A. BURRILL.